UNITED STATES PATENT OFFICE.

HENRY H. CUMMINGS, OF MALDEN, MASSACHUSETTS.

RIVET.

SPECIFICATION forming part of Letters Patent No. 414,682, dated November 12, 1889.

Application filed February 11, 1889. Serial No. 299,389. (No model.)

*To all whom it may concern:*

Be it known that I, HENRY H. CUMMINGS, of Malden, county of Middlesex, State of Massachusetts, have invented an Improvement in Rivets, of which the following description, in connection with the accompanying drawings, is a specification, like letters on the drawings representing like parts.

This invention has for its object the construction of an improved hollow rivet.

My improved rivet consists of a head and a hollow shank tapered outwardly from the under side of the head to the point.

My improved rivet shaped, as described, will preferably have a weakened section to define the bending-line at which the hollow open end of the rivet will bend as the rivet is upset in place, the hollow end, when so upset, forming a second head.

My invention therefore consists, essentially, in a rivet having a head and a hollow or tubular shank tapered externally outwardly from the under side of the head to the point, substantially as will be described.

Figure 1 in longitudinal enlarged section shows one of my improved rivets; Fig. 2, a like view showing the rivet set into leather. Fig. 3 shows the rivet yet further upset and flattened, as it may be. Figs. 4, 5, 6, and 7 show a method of setting my improved rivet, and Fig. 8 shows a modified form of rivet to be described.

My improved rivet has a head $a$ and a tubular shank $b$. The shank externally is tapered outwardly from the under side of the head substantially to the entering end of the rivet, the entering end being of greater diameter than the shank at its junction with the head. The chamber in the shank is of two different diameters, one chamber, as 2, being of a larger diameter and conical, while the chamber 3, leading therefrom to or nearly to the line of the under side of the head, is of smaller diameter, and, as shown, is cylindrical or of substantially uniform diameter. The inner wall of the shank at its entering end will preferably be beveled somewhat abruptly, as shown in Fig. 1, to facilitate the entrance into it of the stretcher $e'$, and preferably the hollow shank may have a weakened section, as 4, where its wall is thinnest, to thus form a defined bending-point for the rivet, as the open entering end thereof is turned outwardly or upset or clinched in the leather. I do not desire, however, to limit my invention to always using the weakened section, as it may be omitted, as in Fig. 8.

To set my improved rivet, the stock $s$, of leather or other material, has a hole $e$ punctured through it, as in Fig. 4. The stretcher $e'$ is moved to enter the hole $e$ and stretch the stock, the stretcher meeting the end of the rivet supported by a plunger $f$. The stretcher having met the rivet, as in Fig. 5, the plunger is moved to pass the rivet toward the stock, pushing the stretcher backwardly through the stock, the rivet following it, as in Fig. 6. After the stretcher has been sufficiently retracted to enable the end of the rivet to be passed through the hole $s$, then the said stretcher is moved for a short distance toward the stock sufficiently to enable the beveled end to somewhat expand the rivet, as in Fig. 6, where such expansion is visible, as compared with Fig. 5. Next, the plunger $g$ acts upon the flared hollow end of the rivet, and which spreads and turns over the outwardly-flared end of the rivet to make a head-like end $h$, as represented in Figs. 7 and 2, while the real head of the rivet rests on the plunger $f$. By forcing the plungers $f$ and $g$ yet closer together the body of the rivet may be expanded, as in Fig. 3, the opening 3 in the rivet being substantially closed. This provision of leaving the shank hollow at 3, so that it may be expanded or bulged, as at 10, Fig. 3, enables the rivet to better fill the hole $e$, and enables the hole to be closed more completely at 12, and, further, it makes it possible to rivet very thin stock and make the rivet hold the stock snugly.

By beveling the end of the rivet, as at 2, it is possible to make a better-shaped or thin-edged head-like portion $h$ than were the said beveling omitted.

The rivet bends or turns over next the stock in the line of the weakened section 4 before the shank within the stock is expanded.

A machine for setting the rivet herein shown will form the subject of another application for patent.

I do not herein claim a headed rivet having a tubular shank tapered externally outwardly from the under side of the head to the end of

UNITED STATES PATENT OFFICE.

HENRY H. CUMMINGS, OF MALDEN, MASSACHUSETTS.

RIVET.

SPECIFICATION forming part of Letters Patent No. 414,682, dated November 12, 1889.

Application filed February 11, 1889. Serial No. 299,389. (No model.)

*To all whom it may concern:*

Be it known that I, HENRY H. CUMMINGS, of Malden, county of Middlesex, State of Massachusetts, have invented an Improvement in Rivets, of which the following description, in connection with the accompanying drawings, is a specification, like letters on the drawings representing like parts.

This invention has for its object the construction of an improved hollow rivet.

My improved rivet consists of a head and a hollow shank tapered outwardly from the under side of the head to the point.

My improved rivet shaped, as described, will preferably have a weakened section to define the bending-line at which the hollow open end of the rivet will bend as the rivet is upset in place, the hollow end, when so upset, forming a second head.

My invention therefore consists, essentially, in a rivet having a head and a hollow or tubular shank tapered externally outwardly from the under side of the head to the point, substantially as will be described.

Figure 1 in longitudinal enlarged section shows one of my improved rivets; Fig. 2, a like view showing the rivet set into leather. Fig. 3 shows the rivet yet further upset and flattened, as it may be. Figs. 4, 5, 6, and 7 show a method of setting my improved rivet, and Fig. 8 shows a modified form of rivet to be described.

My improved rivet has a head $a$ and a tubular shank $b$. The shank externally is tapered outwardly from the under side of the head substantially to the entering end of the rivet, the entering end being of greater diameter than the shank at its junction with the head. The chamber in the shank is of two different diameters, one chamber, as 2, being of a larger diameter and conical, while the chamber 3, leading therefrom to or nearly to the line of the under side of the head, is of smaller diameter, and, as shown, is cylindrical or of substantially uniform diameter. The inner wall of the shank at its entering end will preferably be beveled somewhat abruptly, as shown in Fig. 1, to facilitate the entrance into it of the stretcher $e'$, and preferably the hollow shank may have a weakened section, as 4, where its wall is thinnest, to thus form a defined bending-point for the rivet, as the open entering end thereof is turned outwardly or upset or clinched in the leather. I do not desire, however, to limit my invention to always using the weakened section, as it may be omitted, as in Fig. 8.

To set my improved rivet, the stock $s$, of leather or other material, has a hole $e$ punctured through it, as in Fig. 4. The stretcher $e'$ is moved to enter the hole $e$ and stretch the stock, the stretcher meeting the end of the rivet supported by a plunger $f$. The stretcher having met the rivet, as in Fig. 5, the plunger is moved to pass the rivet toward the stock, pushing the stretcher backwardly through the stock, the rivet following it, as in Fig. 6. After the stretcher has been sufficiently retracted to enable the end of the rivet to be passed through the hole $s$, then the said stretcher is moved for a short distance toward the stock sufficiently to enable the beveled end to somewhat expand the rivet, as in Fig. 6, where such expansion is visible, as compared with Fig. 5. Next, the plunger $g$ acts upon the flared hollow end of the rivet, and which spreads and turns over the outwardly-flared end of the rivet to make a head-like end $h$, as represented in Figs. 7 and 2, while the real head of the rivet rests on the plunger $f$. By forcing the plungers $f$ and $g$ yet closer together the body of the rivet may be expanded, as in Fig. 3, the opening 3 in the rivet being substantially closed. This provision of leaving the shank hollow at 3, so that it may be expanded or bulged, as at 10, Fig. 3, enables the rivet to better fill the hole $e$, and enables the hole to be closed more completely at 12, and, further, it makes it possible to rivet very thin stock and make the rivet hold the stock snugly.

By beveling the end of the rivet, as at 2, it is possible to make a better-shaped or thin-edged head-like portion $h$ than were the said beveling omitted.

The rivet bends or turns over next the stock in the line of the weakened section 4 before the shank within the stock is expanded.

A machine for setting the rivet herein shown will form the subject of another application for patent.

I do not herein claim a headed rivet having a tubular shank tapered externally outwardly from the under side of the head to the end of the shank; nor do I claim a headed rivet having a conical shank tapering outwardly from the head, said shank having a cavity corresponding in general outline to the external shape of the shank and extending throughout the length of said shank.

I herein have shown, but do not claim, a headed rivet having a cavity in its shank, said cavity having an enlargement, which weakens the surrounding wall at a point between the head and the end of the shank.

I claim—

1. The herein-described hollow rivet, having a head and having its body provided with a conical chamber 2 and a smaller chamber 3, substantially as described.

2. A rivet having a head and a hollow shank tapered outwardly from its head to its point, the said shank having a weakened section formed by reducing the thickness of the wall of the shank at 4, substantially as described.

In testimony whereof I have signed my name to this specification in the presence of two subscribing witnesses.

HENRY H. CUMMINGS.

Witnesses:
GEO. W. GREGORY,
A. S. WIEGAND.